(12) United States Patent
Chiang et al.

(10) Patent No.: US 11,477,444 B2
(45) Date of Patent: Oct. 18, 2022

(54) METHOD AND APPARATUS OF ENCODING OR DECODING VIDEO DATA WITH INTRA PREDICTION MODE MAPPING

(71) Applicant: HFI Innovation Inc., Zhubei (TW)

(72) Inventors: Man-Shu Chiang, Hsinchu (TW); Chia-Ming Tsai, Hsinchu (TW); Chih-Wei Hsu, Hsinchu (TW)

(73) Assignee: HFI INNOVATION INC., Zhubei (TW)

( * ) Notice: Subject to any disclaimer, the term of this patent is extended or adjusted under 35 U.S.C. 154(b) by 0 days.

(21) Appl. No.: 17/631,011

(22) PCT Filed: Aug. 3, 2020

(86) PCT No.: PCT/CN2020/106616
§ 371 (c)(1),
(2) Date: Jan. 28, 2022

(87) PCT Pub. No.: WO2021/023158
PCT Pub. Date: Feb. 11, 2021

(65) Prior Publication Data
US 2022/0279173 A1 Sep. 1, 2022

Related U.S. Application Data

(60) Provisional application No. 62/883,149, filed on Aug. 6, 2019.

(51) Int. Cl.
*H04N 19/11* (2014.01)
*H04N 19/176* (2014.01)
(Continued)

(52) U.S. Cl.
CPC ........... *H04N 19/11* (2014.11); *H04N 19/159* (2014.11); *H04N 19/176* (2014.11); *H04N 19/186* (2014.11); *H04N 19/593* (2014.11)

(58) Field of Classification Search
CPC .... H04N 19/11; H04N 19/159; H04N 19/176; H04N 19/186; H04N 19/593
See application file for complete search history.

(56) References Cited

U.S. PATENT DOCUMENTS

| | | |
|---|---|---|
| 9,716,894 B2 | 7/2017 | Joshi et al. |
| 10,284,860 B1 | 5/2019 | Zhao et al. |

(Continued)

FOREIGN PATENT DOCUMENTS

| | | |
|---|---|---|
| CN | 105144718 A | 12/2015 |
| WO | 2018/064948 A1 | 4/2018 |

(Continued)

OTHER PUBLICATIONS

International Search Report and Written Opinion dated Nov. 6, 2020, issued in application No. PCT/CN2020/106616.

(Continued)

*Primary Examiner* — Tsion B Owens
(74) *Attorney, Agent, or Firm* — McClure, Qualey & Rodack, LLP

(57) ABSTRACT

A video processing method for a video encoder or decoder comprises receiving input data of a current chroma block in a current picture coded in a 4:2:2 color format, determining a luma mode of a luma block corresponding to the current chroma block, mapping the luma mode to a mapped intra mode of the current chroma block, selectively replacing the mapped intra mode by wide angle intra prediction mapping based on a width to height ratio of the current chroma block, deriving an intra predictor according to the mapped intra mode after wide angle intra prediction mapping, and encoding or decoding the current chroma block according to the intra predictor. The mapped intra mode is mode 57 when the luma mode is mode 61 and the mapped intra mode is mode 55 when the luma mode is mode 57.

19 Claims, 12 Drawing Sheets

(51) Int. Cl.
*H04N 19/186* (2014.01)
*H04N 19/593* (2014.01)
*H04N 19/159* (2014.01)

(56) References Cited

U.S. PATENT DOCUMENTS

| | | | |
|---|---|---|---|
| 11,284,082 B2* | 3/2022 | Koo | H04N 19/132 |
| 2012/0177112 A1* | 7/2012 | Guo | H04N 19/11 |
| | | | 375/E7.243 |
| 2014/0098189 A1 | 4/2014 | Deng et al. | |
| 2021/0211709 A1* | 7/2021 | Zhang | H04N 19/105 |
| 2022/0182636 A1* | 6/2022 | Zhu | H04N 19/159 |
| 2022/0191531 A1* | 6/2022 | Sim | H04N 19/86 |

FOREIGN PATENT DOCUMENTS

| | | |
|---|---|---|
| WO | 2018/127624 A1 | 7/2018 |
| WO | 2019/174389 A1 | 9/2019 |

OTHER PUBLICATIONS

Heo, J., et al.; "Non-CE3 : Restriction on WAIP for MRL and ISP intra prediction;" Joint Video Experts Team (JVET) of ITU-T SG 16 WP 3 and ISO/IEC JTC 1/SC 29/WG 11; Jul. 2019; pp. 1-4.
Ma, T.C., et al.; "Non-CE3: Unification on WAIP for normal and ISP intra prediction;" Joint Video Experts Team (JVET) of ITU-T SG 16 WP 3 and ISO/IEC JTC 1/SC 29/WG 11; Mar. 2019; pp. 1-4.
Chinese language Notice of Allowance dated Jun. 18, 2021, issued in application No. TW 109126328.

\* cited by examiner

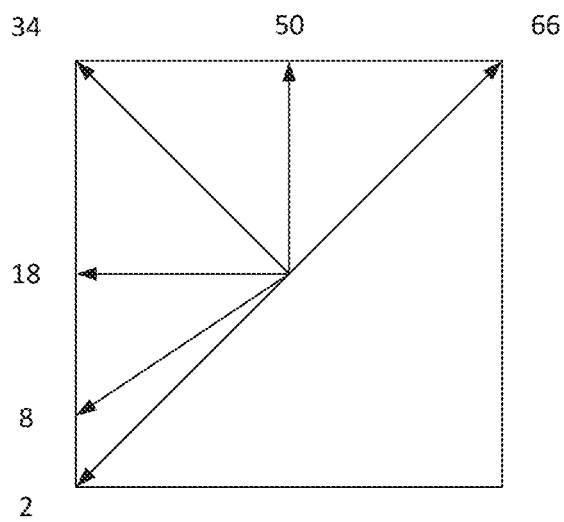
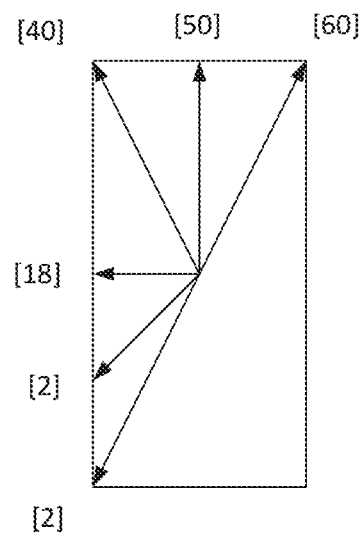
Fig. 7A                    Fig. 7B
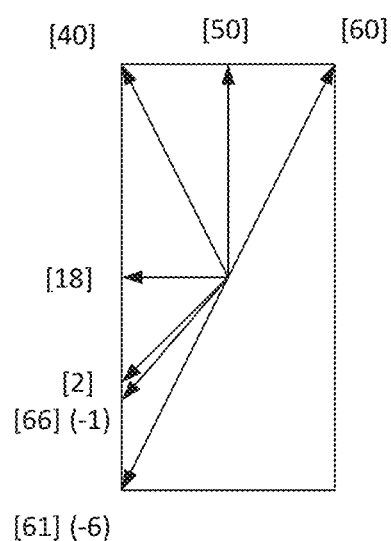
Fig. 7C

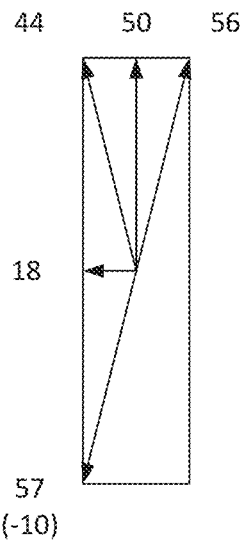
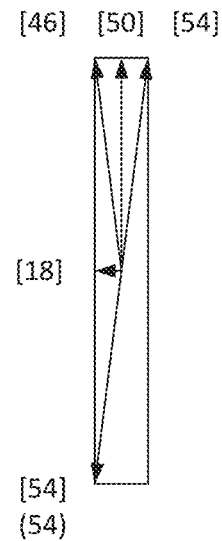
Fig. 9A                    Fig. 9B
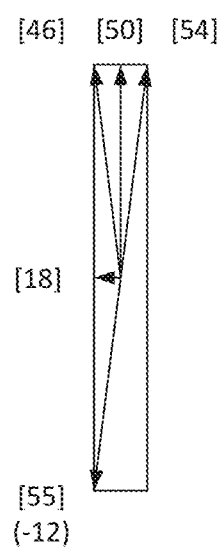
Fig. 9C

METHOD AND APPARATUS OF ENCODING OR DECODING VIDEO DATA WITH INTRA PREDICTION MODE MAPPING

CROSS REFERENCE TO RELATED APPLICATIONS

The present invention claims priority to U.S. Provisional Patent Application, Ser. No. 62/883,149, filed on Aug. 6, 2019, entitled "Intra prediction mode mapping for different block ratios". The above U.S. Provisional Patent Application is hereby incorporated by reference in its entirety.

FIELD OF THE INVENTION

The present invention relates to encoding or decoding video data by intra prediction. In particular, the present invention relates to encoding and decoding video data with intra predictors derived by intra prediction mode mapping.

BACKGROUND AND RELATED ART

High Efficiency Video Coding (HEVC) is a new international video coding standard developed by the Joint Collaborative Team on Video Coding (JCT-VC). HEVC is based on the hybrid block based motion compensated Discrete Cosine Transform (DCT)-like transform coding architecture. The basic unit for compression in HEVC, termed Coding Unit (CU), is a 2N×2N square block, and each CU can be recursively split into four smaller CUs until a predefined minimum size is reached. Each CU contains one, two, or four multiple Prediction Units (PUs). Each PU is coded by either intra prediction or inter prediction in HEVC. For each PU coded by inter prediction, one or two temporal reconstructed reference picture are used to generate a motion compensated predictor. There are three different inter prediction modes in HEVC, including Skip, Merge, and Advance Motion Vector Prediction (AMVP) modes. Intra prediction is useful in generating an initial picture or to periodically inserting I-picture or I-blocks for random access or for alleviation of error propagation. Intra prediction is designed to exploit spatial features in the picture such as smooth area, vertical line or edge, horizontal line or edge, and diagonal line or edge within a picture or within a picture region. Intra prediction is also useful for regions with high motion or scene changes. A PU to be coded by intra prediction is relied upon samples in neighboring blocks that have been processed. For example, if blocks in a video picture or picture region are sequentially processed row by row from top to bottom and from left to right, neighboring blocks on the top and neighboring blocks on the left of a current block can be used to form an intra predictor for predicting samples in the current block.

The HEVC standard supports 35 intra prediction modes including 33 angular modes, DC mode, and Planar mode. FIG. 1 illustrates the prediction directions for the 33 angular intra prediction modes supported in the HEVC standard, where H represents the horizontal mode and V represents the vertical mode. The 33 angular intra prediction modes are represented by H, H+1~H+8, H−1~H−7, V, V+1~V+8, V−1~V−8. An intra predictor for a current block coded or to be coded by intra prediction is generated by three steps including intra smoothing filter, intra prediction and intra gradient filter. FIG. 2 illustrates exemplary reference samples filtered by an intra smoothing filter for deriving an intra predictor for a current block. A smoothing filter operation is applied to reference samples 22 of the current block 20 as a pre-processing step before calculating the intra predictor for the current block 20. The smoothing filter operation corresponds to applying a Finite Impulse Response (FIR) intra smoothing filter, [1 2 1]>>2, with low-pass characteristics to the reference samples 22 belonging to a left neighboring column and an above neighboring row of the current block 20. The smoothing filter operation reduces the discontinuities introduced by some of the intra prediction modes by applying the FIR filter. This smoothing filter operation is adaptively applied depending on the intra prediction mode and the size of the current block.

The second step of intra prediction is to derive the intra predictor from neighboring reference samples according to one intra prediction mode selected from the 35 intra prediction modes. The intra prediction mode is decided by the encoder and signaled in the bitstream so the corresponding decoder may parse the intra prediction mode from the bitstream. The value of each sample in the current block is predicted by extrapolating the samples from the reference samples according to the prediction direction of the selected angular mode when an angular mode is selected. The value of each sample in the current block is calculated by assuming an amplitude surface with a horizontal and vertical smooth gradient derived from the boundaries samples of the neighboring blocks when Planar mode is selected. The value of each samples of the current block is an average of the reference samples when DC mode is selected.

An intra gradient filter is applied to samples at the left and top boundaries of the current block in the third step. The concept of applying the intra gradient filter is to utilize the gradient information along the intra prediction direction to improve the quality of intra prediction. FIG. 3A illustrates applying an intra gradient filtering to a predictor predicted by the vertical direction mode or horizontal direction mode. In FIG. 3A, a predicted pixel Pij denotes the predictor at row i and column j, and AL represents a reconstructed sample at the left-above corner of the current block while Li represents a reconstructed sample in the left neighboring column of the current block. A final predicted pixel P'ij for each predicted pixel Pij is calculated by Equation (1) after applying the intra gradient filter.

$$P'ij = Pij + \alpha \cdot (Li - AL) \quad \text{Equation (1)}$$

where α is a fraction from 0 to 1 and is selected according to the horizontal displacement j, for example, α=1/2 when j=0, and α=1/4 when j=1. As for a current block predicted by the horizontal mode, a final predicted pixel P'ij for each predicted pixel Pij is calculated by Equation (2).

$$P'ij = Pij + \alpha \cdot (Aj - AL) \quad \text{Equation (2)}$$

where Aj is a reconstructed sample in the above row. As for the directional modes v+1~v+8 and h+1~h+8, a corresponding reference sample RLi or RAJ of the reconstructed sample Li or Aj is first obtained along the direction of intra prediction to replace the reconstructed sample Li or Aj. Interpolation of integer pixels in the above row or the left column of the current block is applied to generate the corresponding reference sample RLi or RAj when it is not located at the position of an integer pixel. FIG. 3B illustrates examples of applying the intra gradient filter for v+1~v+8 directional modes. A final predicted pixel P'ij is calculated from each predicted pixel Pij according to Equation (3).

$$P'ij = Pij + \alpha \cdot (Li - RLi) \quad \text{Equation (3)}$$

Similar to the vertical mode, a is a fraction from 0 to 1 and is selected according to the direction of intra prediction and the horizontal displacement j. As for h+1~h+8 directional modes, the final predicted pixel P'ij is calculated from each predicted pixel Pij according to Equation (4), where α is a fraction from 0 to 1 and is selected according to the direction of intra prediction and the vertical displacement i.

$$P'ij=Pij+\alpha \cdot (Aj-RAj) \quad \text{Equation (4)}$$

Although the intra gradient filter can be applied in all directional modes v+1~v+8 and h+1~h+8, the intra gradient filter is only applied when the intra prediction mode is DC, horizontal, or vertical mode in the HEVC standard. The samples in the first row and first column of the current block are filtered by the intra gradient filter when the selected intra prediction mode is DC mode. The samples in the first row are filtered by the intra gradient filter when the selected intra prediction mode is the horizontal mode, and the samples in the first column are filtered by the intra gradient filter if the selected intra prediction mode is the vertical mode.

MPM List Generation Out of the 35 intra prediction modes supported in the HEVC standard, three intra prediction modes are considered as Most Probable Modes (MPMs) for predicting a current intra prediction mode for a current block. Neighboring intra prediction modes of a left neighboring block and an above neighboring block are included in the three MPMs. In case the two neighboring intra prediction modes are the same directional mode, or only one of the two neighboring intra prediction modes is available and is a directional mode, two directions immediately next to this neighboring directional mode are also included in the three MPMs. DC mode and Planar mode are also considered as MPMs when the left or above neighboring intra prediction mode is not directional or when the neighboring blocks are not available or not coded in intra prediction. A first MPM flag is signaled to indicate whether the current intra prediction mode is identical to one of the three MPMs, if so, another flag is sent to indicate which of the three MPMs is selected; if the first MPM flag is false, the current intra prediction mode is a non-MPM mode and is explicitly signaled using a 5-bit fixed length codeword.

The 33 angular modes shown in FIG. 1 can be expanded to a general case with more or less angular modes, where each of the angular modes can be represented by mode H+k or mode V+k, where H represents the direction of horizontal mode, V represents the direction of vertical mode, and k=0, +-1, +-2, . . . +-K. An example of 65 angular modes for intra prediction is shown in FIG. 4, where k is ranged from -16 to 16. Mode H-16 and mode V-16 are the same mode, where this mode refers to a prediction direction pointing to a top-left corner of the current block. FIG. 4 illustrates the 65 angular intra prediction modes with additional 32 angular modes in between the original 33 angular modes of the HEVC standard. The 65 angular modes in FIG. 4 include modes H+16 to H-15 from bottom to top at the left boundary of the block and modes V-16 to V+16 from left to right at the upper boundary of the block. These denser directional intra prediction modes can be applied to all block sizes and for both luma and chroma components.

Wide-Angle Intra Prediction Mapping The upcoming emerging video coding standard Versatile Video Coding (VVC) supports various non-square block partitions. Wide-Angle Intra Prediction (WAIP) mode mapping is therefore developed to improve intra prediction for non-square blocks. Several conventional angular intra prediction modes are adaptively replaced with modified intra prediction modes after the WAIP mode mapping process. Conventional angular intra prediction directions are defined from 45 degrees to -135 degrees in clockwise direction. Certain original intra prediction modes will be replaced by modified intra prediction modes after WAIP mode mapping for intra prediction, but the original intra prediction mode indices are still signaled by the video encoder. The corresponding video decoder parses the original intra prediction mode indices and remaps these original intra prediction mode indices into modified intra prediction modes. The total number of intra prediction modes is thus unchanged and the intra mode coding method remains unchanged too. To support WAIP mode mapping, the top reference samples with length 2W+1 and the left reference samples with length 2H+1 are defined in FIGS. 5A and 5B. In FIG. 5A, a current block 52 can be predicted by a left reference sample with an angle greater than the angle of mode 2. In FIG. 5B, a current block 54 can be predicted by a top reference sample with an angle greater than the angle of mode 66. The number of modified intra prediction modes used to replace the original intra prediction modes depends on an aspect ratio of a block. The aspect ratio represents a width to height ratio of the block. The angular intra prediction modes to be replaced by modified intra prediction modes correspond to each aspect ratio are illustrated in Table 1.

TABLE 1

Intra prediction modes to be replaced by WAIP mode mapping

| Aspect ratio | Angular intra prediction modes to be replaced in WAIP mode mapping |
|---|---|
| W/H == 16 | Modes 2, 3, 4, 5, 6, 7, 8, 9, 10, 11, 12, 13, 14, 15 |
| W/H == 8 | Modes 2, 3, 4, 5, 6, 7, 8, 9, 10, 11, 12, 13 |
| W/H == 4 | Modes 2, 3, 4, 5, 6, 7, 8, 9, 10, 11 |
| W/H == 2 | Modes 2, 3, 4, 5, 6, 7, |
| W/H == 1 | None |
| W/H == ½ | Modes 61, 62, 63, 64, 65, 66 |
| W/H == ¼ | Modes 57, 58, 59, 60, 61, 62, 63, 64, 65, 66 |
| W/H == ⅛ | Modes 55, 56, 57, 58, 59, 60, 61, 62, 63, 64, 65, 66 |
| W/H == 1/16 | Modes 53, 54, 55, 56, 57, 58, 59, 60, 61, 62, 63, 64, 65, 66 |

Inputs of the WAIP mode mapping process include a variable predModeIntra specifying an intra prediction mode, a variable nW specifying a width, a variable nH specifying a height, and a variable cIdx specifying a color component. The output of the WAIP mode mapping process is the modified intra prediction mode predModeIntra. The variables nW and nH equal to a transform block width nTbW and a transform block height nTbH if the Intra Sub-Partition (ISP) mode is used in coding a current block or the variable cIdx for the current block is not equal to 0. Otherwise, the variables nW and nH equal to a coding block width nCbW and a coding block height nCbH. The variable cIdx is not equal to 0 when the current block is a chroma block while the variable cIdx is equal to 0 when the current block is a luma block. A variable whRatio is then derived according to the two variables nW and nH by abs(Log 2(nW/nH)). The WAIP mode mapping process includes checking if all following three conditions are true: nW is greater than nH, predModeIntra is greater than or equal to 2, and predModeIntra is less than (whRatio>1)?(8+2*whRatio): 8. The modified intra prediction mode predModeIntra is set to equal to (predModeIntra+65) if all the above three conditions are true. Otherwise, the WAIP mode mapping process further checks if three following conditions are true: nH is greater than nW, predModeIntra is less than or equal to 66, and predModeIntra is greater than (whRatio>1)?(60−2*whRatio): 60. The modified intra prediction mode predModeIntra is set to equal to (predModeIntra−67) if all the three above conditions are true.

BRIEF SUMMARY OF THE INVENTION

A video encoding or decoding method or apparatus for processing video data coded or to be coded in intra prediction is implemented in a video coding system. Embodiments of the video coding system receive input data associated with a current chroma block in a current picture coded in a 4:2:2 color format. The video coding system determines the current chroma block is coded or to be coded by Direct Mode (DM), determines a luma mode of a luma block corresponding to the current chroma block, and then maps the luma mode to a mapped intra mode for the current chroma block. The mapped intra mode is mode 57 when the luma mode is mode 61 and the mapped intra mode is mode 55 when the luma mode is mode 57. The mapped intra mode is selectively replaced by WAIP mode mapping based on a width to height ratio of the current chroma block. An intra predictor is derived for the current chroma block according to the mapped intra mode after WAIP mode mapping, and the current chroma block is encoded or decoded according to the intra predictor.

In one embodiment, the mapped intra mode of mode 57 corresponds to a prediction direction pointing to a bottom-left corner when the width to height ratio of the current chroma block is 1:4, and the mapped intra mode of mode 57 is then replaced by mode −10 after WAIP mode mapping. In another embodiment, the mapped intra mode of mode 55 corresponds to a prediction direction pointing to a bottom-left corner when the width to height ratio of the current chroma block is 1:8, and the mapped intra mode of mode 55 is replaced by mode −12 after WAIP mode mapping.

The current chroma block is encoded or decoded by DM, and the luma block is a collocated block of the current chroma block. In one embodiment, the mapped intra modes for the current chroma block at a bottom-left corner, immediate left, top-left corner, immediate top, and top-right corner are 57, 18, 44, 50, and 56 when the width to height ratio is 1:4. In another embodiment, the mapped intra modes for the current chroma block at a bottom-left corner, immediate left, top-left corner, immediate top, and top-right corner are 55, 18, 46, 50, and 54 when the width to height ratio is 1:8. In another embodiment, the mapped intra modes for the current chroma block at a bottom-left corner, immediate left, top-left corner, immediate top, and top-right corner are 53, 18, 48, 50, and 52 when the width to height ratio is 1:16.

In one embodiment, the mapped intra modes for the current chroma block at a bottom-left corner, immediate left, top-left corner, immediate top, and top-right corner are 8, 18, 38, 50, and 7 when the width to height ratio is 2:1. In another embodiment, the mapped intra modes for the current chroma block at a bottom-left corner, immediate left, top-left corner, immediate top, and top-right corner are 12, 18, 24 50, and 11 when the width to height ratio is 4:1. In another embodiment, the mapped intra modes for the current chroma block at a bottom-left corner, immediate left, top-left corner, immediate top, and top-right corner are 14, 18, 22, 50, and 13 when the width to height ratio is 8:1. In yet another embodiment, the mapped intra modes for the current chroma block at a bottom-left corner, immediate left, top-left corner, immediate top, and top-right corner are 16, 18, 20, 50, and 15 when the width to height ratio is 16:1.

The mapped intra modes replaced by WAIP mode mapping are modes 61 to 66 when the width to height ratio of the current chroma block is 1:2, the mapped intra modes replaced by WAIP mode mapping are modes 57 to 66 when the width to height ratio of the current chroma block is 1:4, the mapped intra modes replaced by WAIP mode mapping are modes 55 to 66 when the width to height ratio of the current chroma block is 1:8, and the mapped intra modes replaced by WAIP mode mapping are modes 53 to 66 when the width to height ratio of the current chroma block is 1:16.

The mapped intra modes replaced by WAIP mode mapping are modes 2 to 7 when the width to height ratio of the current chroma block is 2:1, the mapped intra modes replaced by WAIP mode mapping are modes 2 to 11 when the width to height ratio of the current chroma block is 4:1, the mapped intra modes replaced by WAIP mode mapping are modes 2 to 13 when the width to height ratio of the current chroma block is 8:1, and the mapped intra modes replaced by WAIP mode mapping are modes 2 to 15 when the width to height ratio of the current chroma block is 16:1.

In some embodiments, the step of mapping the luma mode to a mapped intra mode for the current chroma block is executed by looking up a mapping table, and the mapping table is used for all chroma blocks coded or to be coded in DM regardless the width to height ratio. In one embodiment, the luma mode of mode 61 or mode 62 is mapped to mode 57 and the luma mode of mode 57 or 58 is mapped to mode 55 by looking up the mapping table. The luma mode of modes 2 to 7 are mapped to modes 61 to 66 respectively according to one embodiment.

Aspects of the disclosure further provide an apparatus in a video coding system for receiving input data associated with a current chroma block coded or to be coded by intra prediction in a current picture coded by a 4:2:2 color format, determining a luma mode of a luma block corresponding to the current chroma block, mapping the luma mode to a mapped intra mode for the current chroma block, selectively replacing the mapped intra mode by WAIP mode mapping based on a width to height ratio of the current chroma block, deriving an intra predictor according to the mapped intra mode after WAIP mode mapping, and encoding or decoding the current chroma block according to the intra predictor. The mapped intra mode is mode 57 when the luma mode is mode 61 and the mapped intra mode is mode 55 when the luma mode is mode 57.

Aspects of the disclosure further provide a non-transitory computer readable medium storing program instructions for causing a processing circuit of an apparatus to encode or decode video data of a current chroma block by intra prediction in a current picture coded in a 4:2:2 color format. A luma mode of a collocated luma block is mapped to a mapped intra mode, where the mapped intra mode is mode 57 when the luma mode is mode 61 and the mapped intra mode is mode 55 when the luma mode is mode 57. The proposed chroma mode mapping ensures the mapped intra mode for a chroma block pointing to a bottom-left corner is a distinct mode from any possible mapped intra mode for the chroma block. Other aspects and features of the invention will become apparent to those with ordinary skill in the art upon review of the following descriptions of specific embodiments.

BRIEF DESCRIPTION OF THE DRAWINGS

Various embodiments of this disclosure that are proposed as examples will be described in detail with reference to the following figures, wherein like numerals reference like elements, and wherein:

FIG. 7A illustrates a square luma block coded in a 4:2:2 color format;

FIG. 7B illustrates a corresponding chroma block with mapped intra modes derived by a conventional chroma mode mapping method;

FIG. 7C illustrates a corresponding chroma block with mapped intra modes derived by chroma mode mapping according to an embodiment of the present invention.

FIG. 9A illustrates a luma block with a width to height ratio of 1:4 coded in a 4:2:2 color format;

FIG. 9B illustrates a corresponding chroma block with mapped intra modes derived by a conventional chroma mode mapping method;

FIG. 9C illustrates a corresponding chroma block with mapped intra modes derived by chroma mode mapping according to an embodiment of the present invention.

FIG. 10A illustrates a chroma block having a width to height ratio of 1:16 with mapped intra modes derived by chroma mode mapping according to an embodiment of the present invention;

FIG. 10B illustrates a chroma block having a width to height ratio of 2:1 with mapped intra modes derived by chroma mode mapping according to an embodiment of the present invention;

FIG. 10C illustrates a chroma block having a width to height ratio of 4:1 with mapped intra modes derived by chroma mode mapping according to an embodiment of the present invention;

FIG. 10D illustrates a chroma block having a width to height ratio of 8:1 with mapped intra modes derived by chroma mode mapping according to an embodiment of the present invention;

FIG. 10E illustrates a chroma block having a width to height ratio of 16:1 with mapped intra modes derived by chroma mode mapping according to an embodiment of the present invention.

DETAILED DESCRIPTION OF THE INVENTION

It will be readily understood that modules and components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention.

Reference throughout this specification to "an embodiment", "some embodiments", or similar language means that a particular feature, structure, or characteristic described in connection with the embodiments may be included in at least one embodiment of the present invention. Thus, appearances of the phrases "in an embodiment" or "in some embodiments" in various places throughout this specification are not necessarily all referring to the same embodiment, these embodiments can be implemented individually or in conjunction with one or more other embodiments. Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention.

Figure 1:
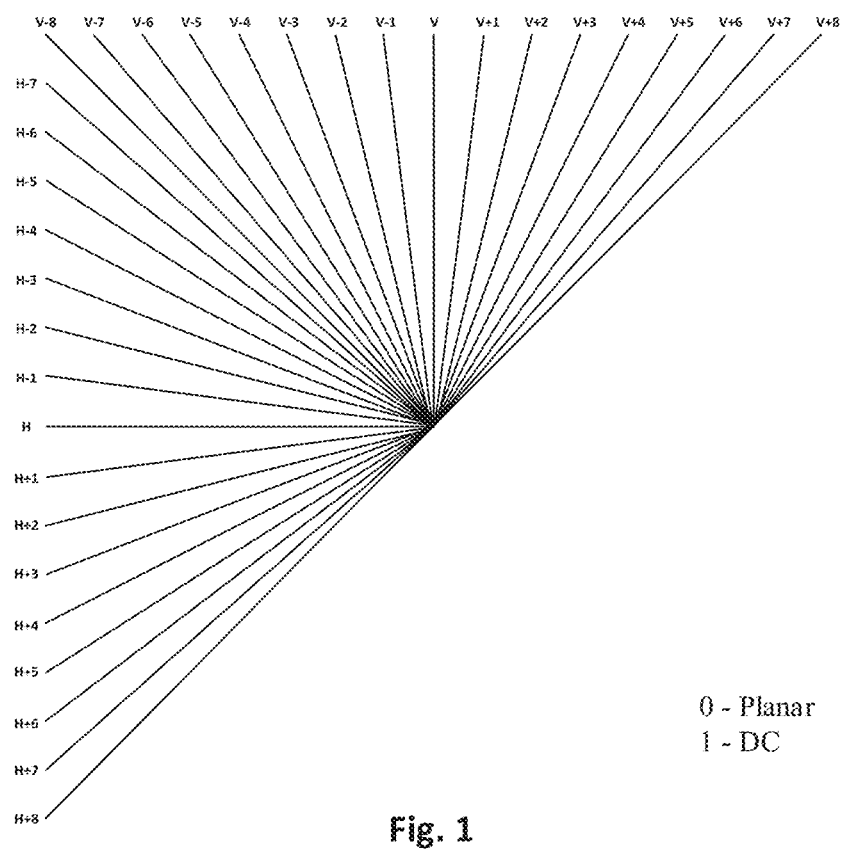
FIG. 1 illustrates 33 angular intra prediction modes supported in the HEVC standard.
Figure 2:
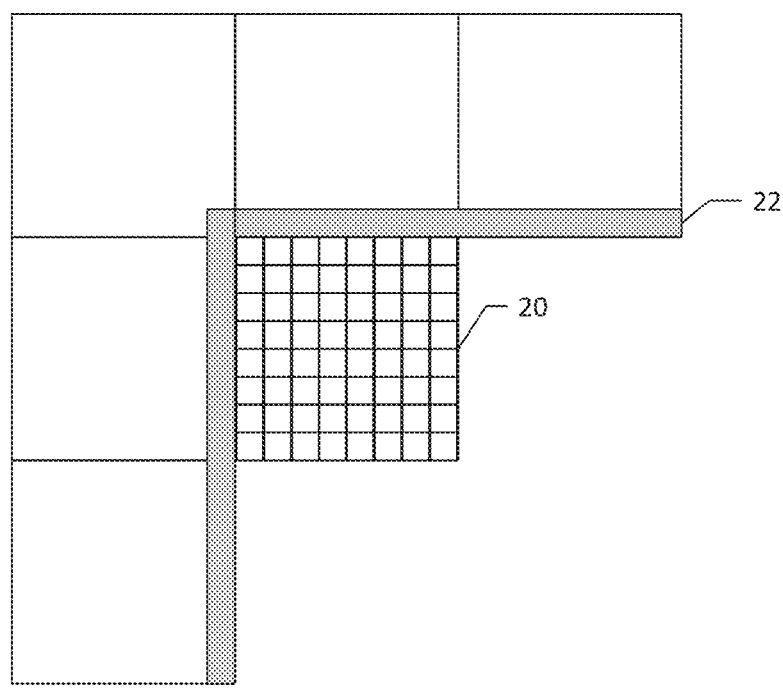
FIG. 2 illustrates exemplary reference samples filtered by an intra smoothing filter for deriving an intra predictor for a current block.
Figure 3A:
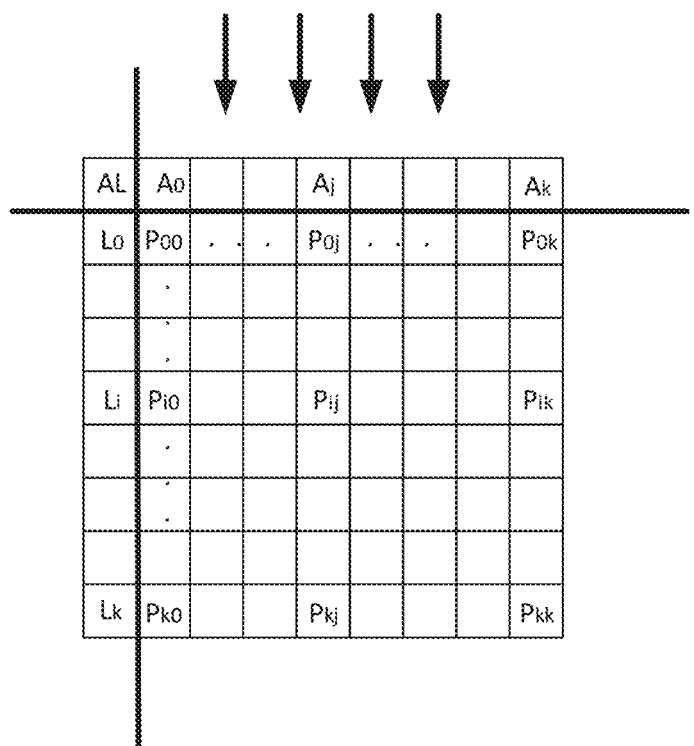
FIG. 3A illustrates applying an intra gradient filtering to a predictor predicted by Vertical mode in intra prediction.
Figure 3B:
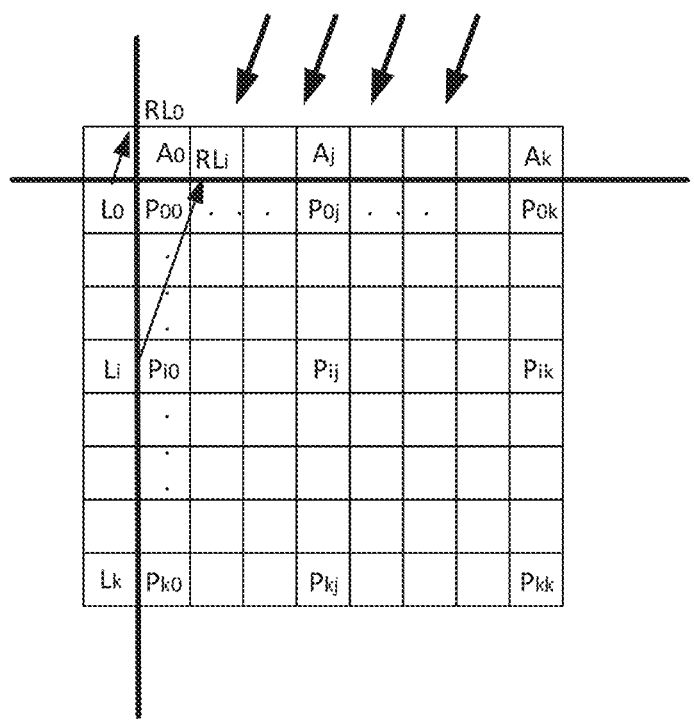
FIG. 3B illustrates applying an intra gradient filtering to a predictor predicted by an angular mode in intra prediction.
Figure 4:
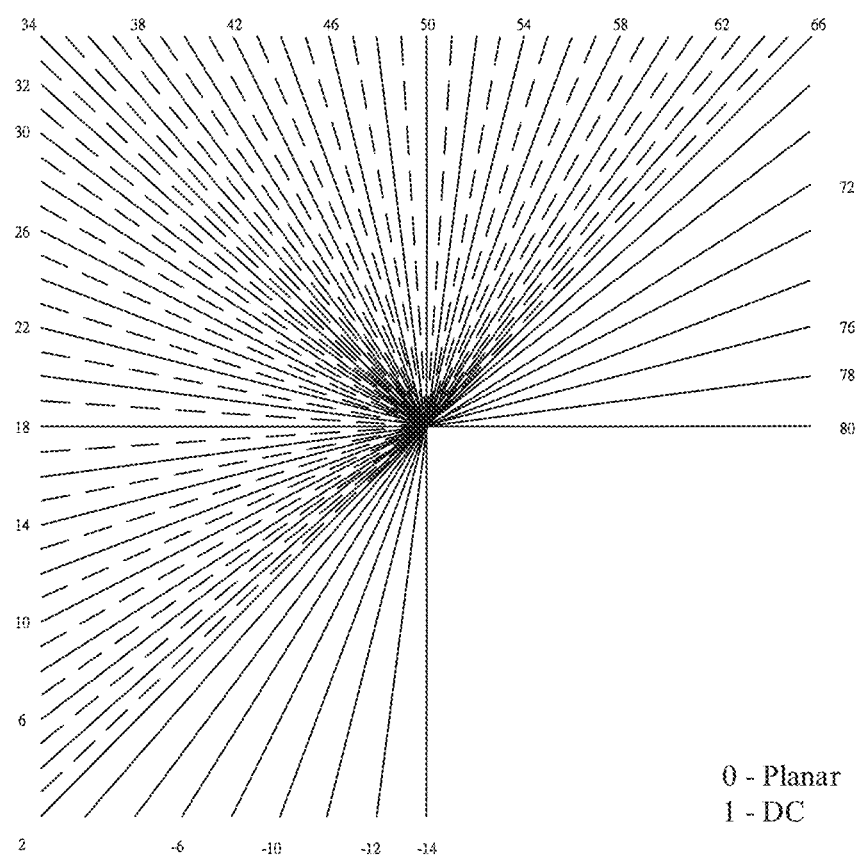
FIG. 4 illustrates an example of 65 angular intra prediction modes.
Figure 5A:
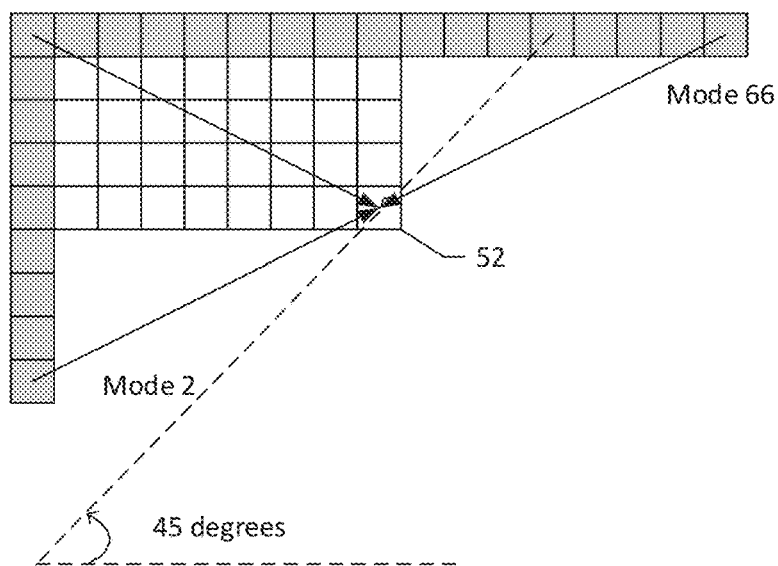
FIGS. 5A and 5B illustrate reference samples for wide-angular intra prediction applied to two exemplary rectangular blocks.
Figure 5B:
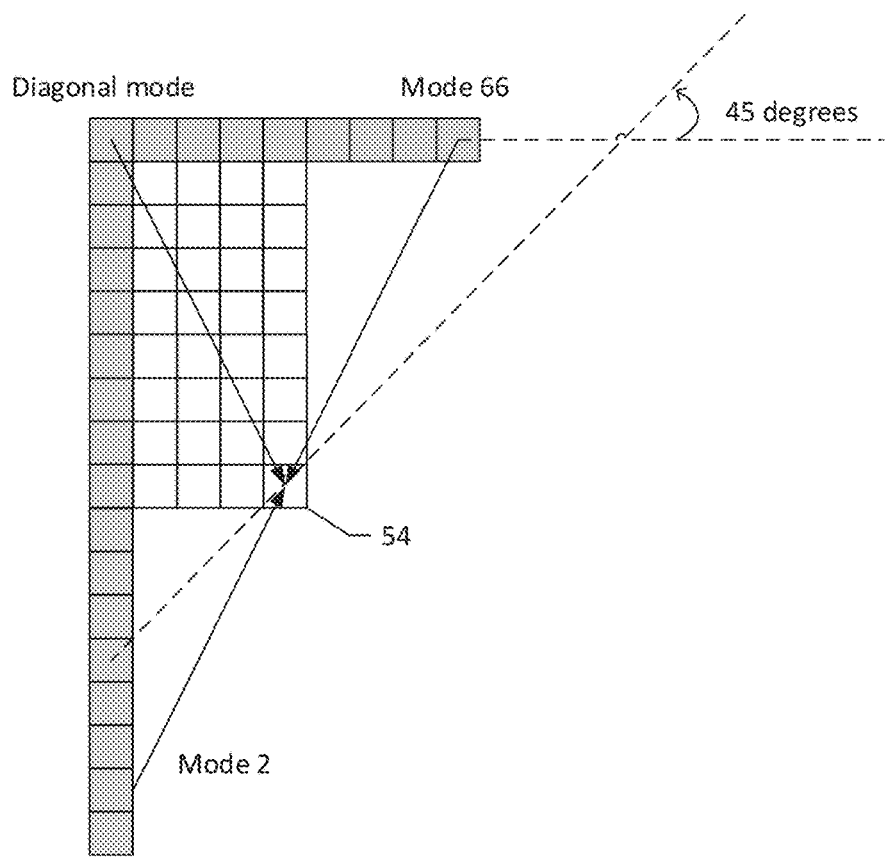
Figure 6A:
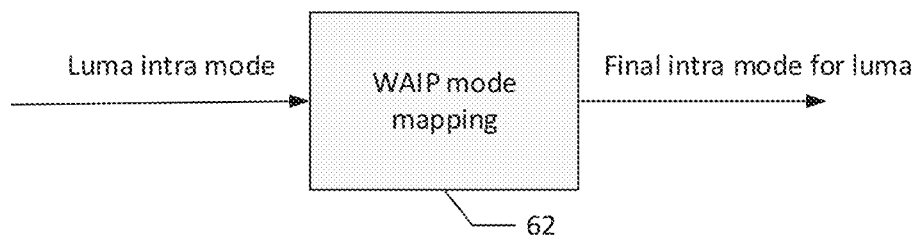
FIGS. 6A and 6B illustrate simplified block diagrams demonstrating intra mode derivation for luma and chroma components.
Figure 6B:
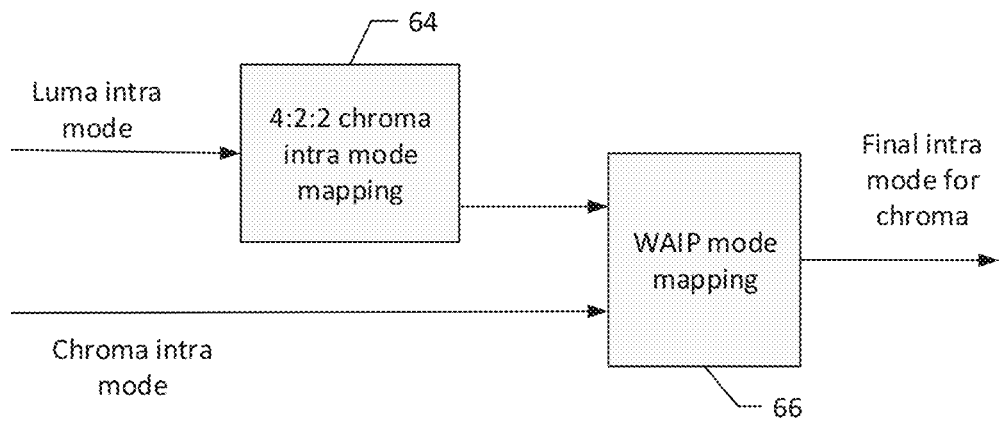

FIG. 6A and FIG. 6B are simplified block diagrams illustrating intra mode derivation for luma and chroma components in a 4:2:2 color format. As shown in FIG. 6A, a luma mode of a luma block is processed by a Wide Angle Intra Prediction (WAIP) mode mapping module 62 to generate a final intra mode for the luma block. The luma mode of the luma block is signaled in the video bitstream by MPM signaling or fixed length signaling depending on whether the luma mode is belong to one of the MPMs. Based on the width to height ratio of the luma block, only the modes listed in Table 1 will be replaced by corresponding wide angle modes after WAIP mode mapping. As shown in FIG. 6B, if Direct Mode (DM) is selected for a chroma block, a corresponding luma mode is converted by a 4:2:2 chroma intra mode mapping module 64 to generate a mapped intra mode for the chroma block. The corresponding luma intra mode is signaled in or parsed from the video bitstream for the collocated luma block of the chroma block. The mapped intra mode is then processed by a WAIP mode mapping module 66 to generate a final intra mode for the chroma block. If the chroma block is not coded by DM, a chroma intra mode of the chroma block is determined and then processed by the WAIP mode mapping module 66 to generate a final intra mode for the chroma block. The chroma intra mode is signaled in the video bitstream instead of the final intra mode after WAIP mode mapping. Based on the width to height ratio of the chroma block, only the intra modes listed in Table 1 will be replaced by corresponding wide angle modes after WAIP mode mapping. The final intra mode for the luma block or chroma block after WAIP mode mapping is used to generate an intra predictor.

Intra Mode Mapping for Chroma Blocks with Ratio Equal to 1/2 Intra mode mapping for chroma is used for deriving a chroma intra mode for a chroma block coded or to be coded in Direct Mode (DM) when 4:2:2 color format is selected. Specifically speaking, intra mode mapping converts an intra prediction mode of a corresponding luma block to a chroma intra mode for the chroma block. The intra prediction mode is a signaled luma intra prediction mode for the luma block corresponding to the chroma block. Table 2 and Table 3 are intra mode mapping tables used in intra mode mapping for HEVC range extension and VTM-5.0 respectively, where VTM-5.0 is the software of VVC draft 5. There are 33 intra angular modes and 65 intra angular modes used in intra prediction for HEVC range extension and VTM-5.0 respectively. In Table 2 and Table 3, modeIdx indicates the intra prediction mode for the corresponding luma block before intra mode mapping for chroma and IntraPredModeC indicates the mapped intra prediction mode for the chroma block in the 4:2:2 color format. For processing non-square chroma blocks in the 4:2:2 color format, WAIP mode mapping is also used to improve intra prediction after intra mode mapping for chroma to further change IntraPredModeC to a modified intra prediction mode.

FIG. 7A illustrates an example of a square luma block and FIG. 7B illustrates a corresponding chroma block in the 4:2:2 color format with several mapped modes derived according to Table 3 defined in VTM5.0. As the luma block has a width to height ratio equal to 1:1, the corresponding chroma block has a width to height ratio equal to 1:2. Some exemplary block sizes for the chroma block are 64×128, 32×64, 16×32, 8×16, and 4×8 samples. In order to derive a chroma intra prediction mode of the chroma block, a mapped intra prediction mode IntraPredModeC for the chroma block is first derived from a corresponding luma intra prediction mode modeIdx according to a mapping table. A WAIP mode mapping process is then selectively applied to IntraPredModeC to further map to a modified intra prediction mode according to the width to height ratio. The modified intra prediction mode is used to generate prediction samples for the chroma block. As shown in FIGS. 7A and 7B, modeIdx equals to 66 is mapped to 60, modeIdx equals to 8 is mapped to 2, and modeIdx equals to 34 is mapped to 40. For any modeIdx between mode 2 and mode 7, the mapped intra prediction mode IntraPredModeC is always 2.

TABLE 2

Intra mode mapping for chroma in HEVC range extension

| | | modeIdx | | | | | | | | | | | | | | |
|---|---|---|---|---|---|---|---|---|---|---|---|---|---|---|---|---|
| IntraPredModeC | X <= 2 | 3 | 4 | 5 | 6 | 7 | 8 | 9 | 10 | 11 | 12 | 13 | 14 | 15 | 16 | 17 |
| | X | 2 | 2 | 2 | 3 | 5 | 7 | 8 | 10 | 12 | 13 | 15 | 17 | 18 | 19 | 20 |

| | modeIdx | | | | | | | | | | | | | | | |
|---|---|---|---|---|---|---|---|---|---|---|---|---|---|---|---|---|
| IntraPredModeC | 18 | 19 | 20 | 21 | 22 | 23 | 24 | 25 | 26 | 27 | 28 | 29 | 30 | 31 | 32 | 33 | 34 |
| | 21 | 22 | 23 | 23 | 24 | 24 | 25 | 25 | 26 | 27 | 27 | 28 | 28 | 29 | 29 | 30 | 31 |

TABLE 3

Intra mode mapping for chroma in VTM-5.0

| | | modeIdx | | | | | | | | | | | | | | |
|---|---|---|---|---|---|---|---|---|---|---|---|---|---|---|---|---|
| IntraPredModeC | X <= 1 | 2 | 3 | 4 | 5 | 6 | 7 | 8 | 9 | 10 | 11 | 12 | 13 | 14 | 15 | 16 |
| | X | 2 | 2 | 2 | 2 | 2 | 2 | 2 | 3 | 4 | 6 | 8 | 10 | 12 | 13 | 14 |

| | modeIdx | | | | | | | | | | | | | | | |
|---|---|---|---|---|---|---|---|---|---|---|---|---|---|---|---|---|
| IntraPredModeC | 17 | 18 | 19 | 20 | 21 | 22 | 23 | 24 | 25 | 26 | 27 | 28 | 29 | 30 | 31 | 32 | 33 |
| | 16 | 18 | 20 | 22 | 23 | 24 | 26 | 28 | 30 | 32 | 33 | 34 | 35 | 36 | 37 | 38 | 39 |

| | modeIdx | | | | | | | | | | | | | | | |
|---|---|---|---|---|---|---|---|---|---|---|---|---|---|---|---|---|
| IntraPredModeC | 34 | 35 | 36 | 37 | 38 | 39 | 40 | 41 | 42 | 43 | 44 | 45 | 46 | 47 | 48 | 49 | 50 |
| | 40 | 41 | 42 | 43 | 44 | 44 | 44 | 45 | 46 | 46 | 46 | 47 | 48 | 48 | 48 | 49 | 50 |

| | modeIdx | | | | | | | | | | | | | | | |
|---|---|---|---|---|---|---|---|---|---|---|---|---|---|---|---|---|
| IntraPredModeC | 51 | 52 | 53 | 54 | 55 | 56 | 57 | 58 | 59 | 60 | 61 | 62 | 63 | 64 | 65 | 66 |
| | 51 | 52 | 52 | 52 | 53 | 54 | 54 | 54 | 55 | 56 | 56 | 56 | 57 | 58 | 59 | 60 |

TABLE 4

Intra mode mapping for chroma in VTM-5.0

| | | | | | | | modeIdx | | | | | | | | | |
|---|---|---|---|---|---|---|---|---|---|---|---|---|---|---|---|---|
| IntraPredModeC | X<= 1 | 2 | 3 | 4 | 5 | 6 | 7 | 8 | 9 | 10 | 11 | 12 | 13 | 14 | 15 | 16 |
| | X | 61 | 62 | 63 | 64 | 65 | 66 | 2 | 3 | 4 | 6 | 8 | 10 | 12 | 13 | 14 |

| | | | | | | modeIdx | | | | | | | | | |
|---|---|---|---|---|---|---|---|---|---|---|---|---|---|---|---|
| IntraPredModeC | 17 | 18 | 19 | 20 | 21 | 22 | 23 | 24 | 25 | 26 | 27 | 28 | 29 | 30 | 31 | 32 | 33 |
| | 16 | 18 | 20 | 22 | 23 | 24 | 26 | 28 | 30 | 32 | 33 | 34 | 35 | 36 | 37 | 38 | 39 |

| | | | | | | modeIdx | | | | | | | | | |
|---|---|---|---|---|---|---|---|---|---|---|---|---|---|---|---|
| IntraPredModeC | 34 | 35 | 36 | 37 | 38 | 39 | 40 | 41 | 42 | 43 | 44 | 45 | 46 | 47 | 48 | 49 | 50 |
| | 40 | 41 | 42 | 43 | 44 | 44 | 44 | 45 | 46 | 46 | 46 | 47 | 48 | 48 | 48 | 49 | 50 |

| | | | | | | modeIdx | | | | | | | | | |
|---|---|---|---|---|---|---|---|---|---|---|---|---|---|---|---|
| IntraPredModeC | 51 | 52 | 53 | 54 | 55 | 56 | 57 | 58 | 59 | 60 | 61 | 62 | 63 | 64 | 65 | 66 |
| | 51 | 52 | 52 | 52 | 53 | 54 | 54 | 54 | 55 | 56 | 56 | 56 | 57 | 58 | 59 | 60 |

FIG. 7C illustrates a corresponding chroma block in the 4:2:2 color format with several mapped modes derived according to Table 4 defined in VTM6.0. According to Table 4 and as shown in FIG. 7C, the mapped intra prediction mode IntraPredModeC is equal to 61 when modeIdx is equal to 2, and the mapped intra prediction mode IntraPredModeC is equal to 66 when modeIdx is equal to 7. Based on the WAIP mode mapping process, when the mapped intra prediction mode IntraPredModeC is equal to any mode between 61 and 66, the WAIP mode mapping process maps IntraPredModeC to a mode between −6 and −1. For example, when IntraPredModeC of the chroma block is equal to 61 and the ratio of chroma CB width and chroma CB height is 1:2, the intra prediction mode is replaced by mode −6. As shown in FIG. 7C, the mapped intra modes for a chroma block with a ratio of 1/2 at the bottom-left corner, immediate, left, left-top corner, immediate top, and top-right corner are modes 61, 18, 40, 50, and 60 respectively. Out of these mapped intra modes, only the mapped intra mode at the bottom-left corner is replaced by mode −6 after the WAIP mode mapping process, the remaining mapped modes are remained unchanged after WAIP mode mapping.

Figure 8A:
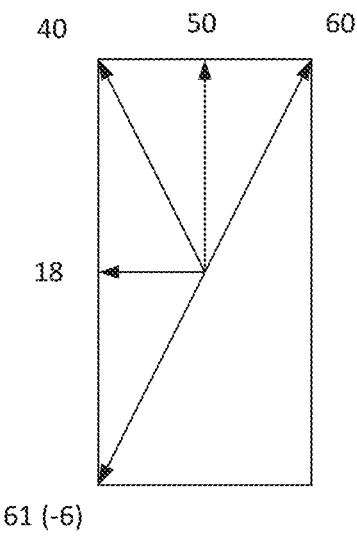
FIG. 8A illustrates a luma block with a width to height ratio of 1:2 coded in a 4:2:2 color format.
Figure 8B:
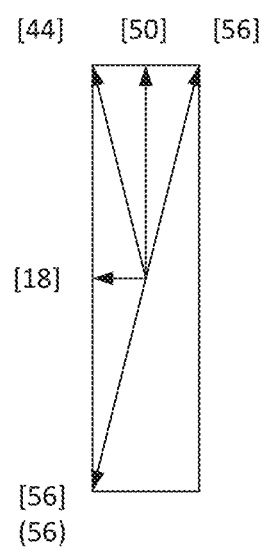
FIG. 8B illustrates a corresponding chroma block with mapped intra modes derived by a convention chroma mode mapping method.
Figure 8C:
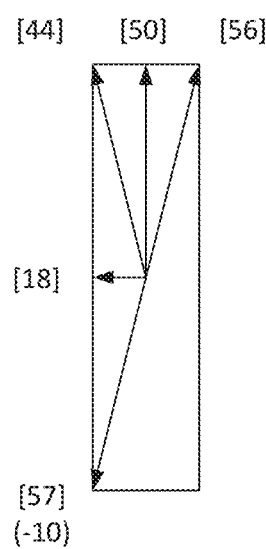
FIG. 8C illustrates a corresponding chroma block with mapped intra modes derived by chroma mode mapping according to an embodiment of the present invention.

Intra Mode Mapping for Chroma Blocks with Ratio Equal to 1/4 FIG. 8A illustrates an example of a luma block with a width to height ratio equal to 1:2 and FIGS. 8B and 8C illustrate corresponding chroma blocks with a width to height ratio equal to 1:4 for the 4:2:2 color format. For example, the size of the chroma block in FIG. 8B or FIG. 8C is 16×64, 8×32, or 4×16 samples. The mapped intra modes for the chroma block shown in FIG. 8B are derived from 4:2:2 chroma intra mode mapping according to Table 4 defined in VTM6.0. It is notice that the mapped intra mode for the chroma block at the bottom-left corner and the mapped intra mode at the top-right corner are all equal to 56 as shown in FIG. 8B. For the chroma block with a width to height ratio equal to 1:4, the final intra mode after wide-angle mode conversion is remained to be 56 when IntraPreModeC is equal to 56 as this mode corresponds to the top-right corner. Embodiments of the present invention modify 4:2:2 intra mode mapping for chroma to distinguish the mapped intra modes at the bottom-left corner and at the top-right corner for chroma blocks with width to height ratio equal to 1:4. An embodiment of a modified 4:2:2 intra mode mapping table for chroma is demonstrated in Table 5. The mapping table as shown in Table 5 is used for all chroma blocks coded or to be coded in DM, in other words, this mapping table is for all kinds of width to height ratios. Compared with Table 4, most of the mapped intra modes IntraPredModeC in Table 5 are unchanged except for the numbers in bold. The mapped intra modes for the chroma block shown in FIG. 8C are derived from a modified 4:2:2 mode mapping table according to an embodiment of the present invention. The mapped intra mode for the chroma block shown in FIG. 8C at the bottom-left corner is 57, which is a distinct mode from the mapped intra mode at the top-right corner. For a chroma block with a width to height ratio equal to 1:4 coded by DM, when a corresponding luma mode modeIdx is equal to 61, the mapped intra prediction mode IntraPreModeC is 57. WAIP mode mapping converts any mapped intra mode between modes 57 to 66 for chroma blocks with a width to height ratio equal to 1:4 to modes −10 to −1. At both the encoder and decoder, the mapped intra prediction mode of mode 57 is replaced by mode −10 after wide-angle mode conversion, and an intra predictor for the chroma block is derived according to mode −10 in intra prediction. In the embodiment as shown in FIG. 8C, the mapped intra modes for a chroma block with a ratio of 1/4 at the bottom-left corner, immediate left, left-top corner, immediate top, and top-right corner are modes 57, 18, 44, 50, and 56 respectively. Out of these mapped intra modes, only the mapped intra mod at the bottom-left corner is replace by a wide angle mode after WAIP mode mapping for intra predictor generation, the remaining mapped modes are remained unchanged after WAIP mode mapping for intra predictor generation.

TABLE 5

Intra mode mapping for chroma according to an embodiment

| | | | | | | | modeIdx | | | | | | | | | |
|---|---|---|---|---|---|---|---|---|---|---|---|---|---|---|---|---|
| IntraPredModeC | X <= 1 | 2 | 3 | 4 | 5 | 6 | 7 | 8 | 9 | 10 | 11 | 12 | 13 | 14 | 15 | 16 |
| | X | 61 | 62 | 63 | 64 | 65 | 66 | 2 | 3 | 4 | 7 | 8 | 11 | 12 | 13 | 14 |

TABLE 5-continued

Intra mode mapping for chroma according to an embodiment

| | modeIdx | | | | | | | | | | | | | | | | |
|---|---|---|---|---|---|---|---|---|---|---|---|---|---|---|---|---|---|
| IntraPredModeC | 17 | 18 | 19 | 20 | 21 | 22 | 23 | 24 | 25 | 26 | 27 | 28 | 29 | 30 | 31 | 32 | 33 |
| | 16 | 18 | 20 | 22 | 23 | 24 | 26 | 28 | 30 | 32 | 33 | 34 | 35 | 36 | 37 | 38 | 39 |

| | modeIdx | | | | | | | | | | | | | | | | |
|---|---|---|---|---|---|---|---|---|---|---|---|---|---|---|---|---|---|
| IntraPredModeC | 34 | 35 | 36 | 37 | 38 | 39 | 40 | 41 | 42 | 43 | 44 | 45 | 46 | 47 | 48 | 49 | 50 |
| | 40 | 41 | 42 | 43 | 44 | 44 | 44 | 45 | 46 | 46 | 46 | 47 | 48 | 48 | 48 | 49 | 50 |

| | modeIdx | | | | | | | | | | | | | | | | |
|---|---|---|---|---|---|---|---|---|---|---|---|---|---|---|---|---|---|
| IntraPredModeC | 51 | 52 | 53 | 54 | 55 | 56 | 57 | 58 | 59 | 60 | 61 | 62 | 63 | 64 | 65 | 66 | |
| | 51 | 52 | 52 | 52 | 53 | 54 | 55 | 55 | 55 | 56 | 57 | 57 | 57 | 58 | 59 | 60 | |

Intra Mode Mapping for Chroma Blocks with Ratio Equal to 1/8 Similar to the chroma blocks with a width to height ratio of 1/4, when a prediction direction for a chroma block with a width to height ratio of 1/8 is pointing to a bottom-left corner, the mapped intra prediction mode 54 is the same as the mapped intra prediction mode for a prediction direction pointing to a top-right corner according to a conventional chroma mode mapping method. The modified 4:2:2 mode mapping table as shown in Table 5 also fixed this shortcoming for chroma blocks with a width to height ratio of 1/8. FIG. 9A illustrates an example of a luma block with a width to height ratio equal to 1/4 coded in the 4:2:2 color format, and FIGS. 9B and 9C illustrate corresponding chroma blocks with a width to height ratio equal to 1/8. For example, the size of the chroma block in FIG. 9B or FIG. 9C is 8×64 or 4×32 samples. The mapped intra modes for the chroma block shown in FIG. 9B are derived from 4:2:2 chroma mode mapping according to Table 4 defined in VTM6.0. In FIG. 9B, the mapped intra modes for the chroma block at the bottom-left corner and top-right corner are both 54. The mapped intra modes for the chroma block shown in FIG. 9C are derived from modified 4:2:2 chroma intra mode mapping according to an embodiment of the present invention. In FIG. 9C, when a prediction direction is pointing to the bottom-left corner, the mapped intra mode for the chroma block is 55, which is a distinct mode compared to all other possible mapped intra modes for this chroma block. The final intra mode for deriving an intra predictor for the chroma block is −12 after wide-angle mode conversion when the prediction direction is pointing to the bottom-left corner. The mapped intra modes to be replaced by WAIP mode mapping are modes 55 to 66 for chroma blocks with a width to height ratio of 1:8. The mapped intra modes 55 to 66 are converted into modes −12 to −1 after WAIP mode mapping for intra predictor generation. In the embodiment as shown in FIG. 9C, the mapped intra modes for a chroma block with a ratio of 1/8 at the bottom-left corner, immediate left, left-top corner, immediate top, and top-right corner are modes 55 18, 46, 50, and 54 respectively. Out of these mapped intra modes, only the mapped intra mode at the bottom-left corner is replaced by mode −2 after WAIP mode mapping for intra predictor generation, the remaining mapped modes are remained unchanged after WAIP mode mapping.

Intra Mode Mapping for Chroma Blocks with Other Ratios Some embodiments of the present invention also consider intra mode mapping for chroma blocks with other width to height ratios. In an example, FIG. 10A illustrates a chroma block having a width to height ratio equal to 1:16. An exemplary size of the chroma block is 64×4 samples. As shown in FIG. 10A, for a chroma block with a width to height ratio equal to 1:16, the mapped intra modes at the bottom-left corner, immediate left, left-top corner, immediate top, and top-right corner are modes 53, 18, 48, 50, and 52 respectively. The mapped intra modes to be replaced by WAIP mode mapping are modes 53 to 66 when the width to height ratio is 1:16, and these mapped intra modes are replaced by modes −14 to −1 respectively. The mapped intra mode at the bottom-left corner is replaced by modes −14 after WAIP mode mapping for intra predictor generation. Since the remaining mapped intra modes at the immediate left, left-top corner, immediate top, and top-right corner are not wide angle modes, these modes are not changed by WAIP mode mapping.

FIG. 10B illustrates a chroma block with a width to height ratio of 2:1, for example, the block size of the chroma block is 128×64, 64×32, 32×16, 16×8, or 8×4 samples. The width to height ratio of the corresponding luma block in the 4:2:2 color format is 4:1, for example, the block size of the corresponding luma block is 128×32, 64×16, 32×8, or 16×4 samples. In the embodiment as shown in FIG. 10B, the mapped intra modes for the chroma block at the bottom-left corner, immediate left, left-top corner, immediate top, and top-right corner are modes 8, 18, 38, 50, and 7 respectively. The mapped intra modes to be replaced by WAIP mode mapping are modes 2 to 7 when the width to height ratio is 2:1, and these mapped intra modes are replaced by modes 67 to 72. Out of these mapped intra modes shown in FIG. 10B, only the one at the top-right corner is belong to a wide angle mode, so the mapped intra mode at the top-right corner is replaced by mode 72 after WAIP mode mapping for intra predictor generation.

FIG. 10C illustrates a chroma block with a width to height ratio of 4:1, for example, the block size of the chroma block is 128×32, 64×16, 32×8, or 16×4 samples. The width to height ratio of the corresponding luma block in the 4:2:2 color format is 8:1. In the embodiment as shown in FIG. 10C, the mapped intra modes for the chroma block at the bottom-left corner, immediate left, left-top corner, immediate top, and top-right corner are modes 12, 18, 24, 50, and 11 respectively. The mapped intra modes to be converted by WAIP mode mapping are modes 2 to 11 when the width to height ratio is 4:1, and these mapped intra modes are replaced by modes 67 to 76. The mapped intra mode at the top-right corner is replaced by mode 76 after WAIP mode mapping for intra predictor generation.

Similar to FIGS. 10B and 10C, FIG. 10D and FIG. 10E illustrate a chroma block with a width to height ratio of 8:1 and 16:1 respectively. For example, the block size of the chroma block in FIG. 10D is 64×8 or 32×4 samples whereas the block size of the chroma block in FIG. 10E is 64×4 samples. In the embodiment as shown in FIG. 10D, the mapped intra modes for the chroma block at the bottom-left corner, immediate left, left-top corner, immediate top, and top-right corner are modes 14, 18, 22, 50, and 13. The mapped intra modes to be converted by WAIP mode mapping are modes 2 to 13 when the width to height ratio is 8:1. The mapped intra mode at the top-right corner is then replaced by mode 78 after WAIP mode mapping for intra predictor generation. In the embodiment as shown in FIG. 10E, the mapped intra modes for the chroma block at the bottom-left corner, immediate left, left-top corner, immediate top, and top-right corner are modes 16, 18, 20, 50, and 15. The mapped intra modes to be converted by WAIP mode mapping are modes 2 to 15 when the width to height ratio is 16:1. The mapped intra mode at the top-right corner is then replaced by mode 80 after WAIP mode mapping for intra predictor generation.

Figure 11:
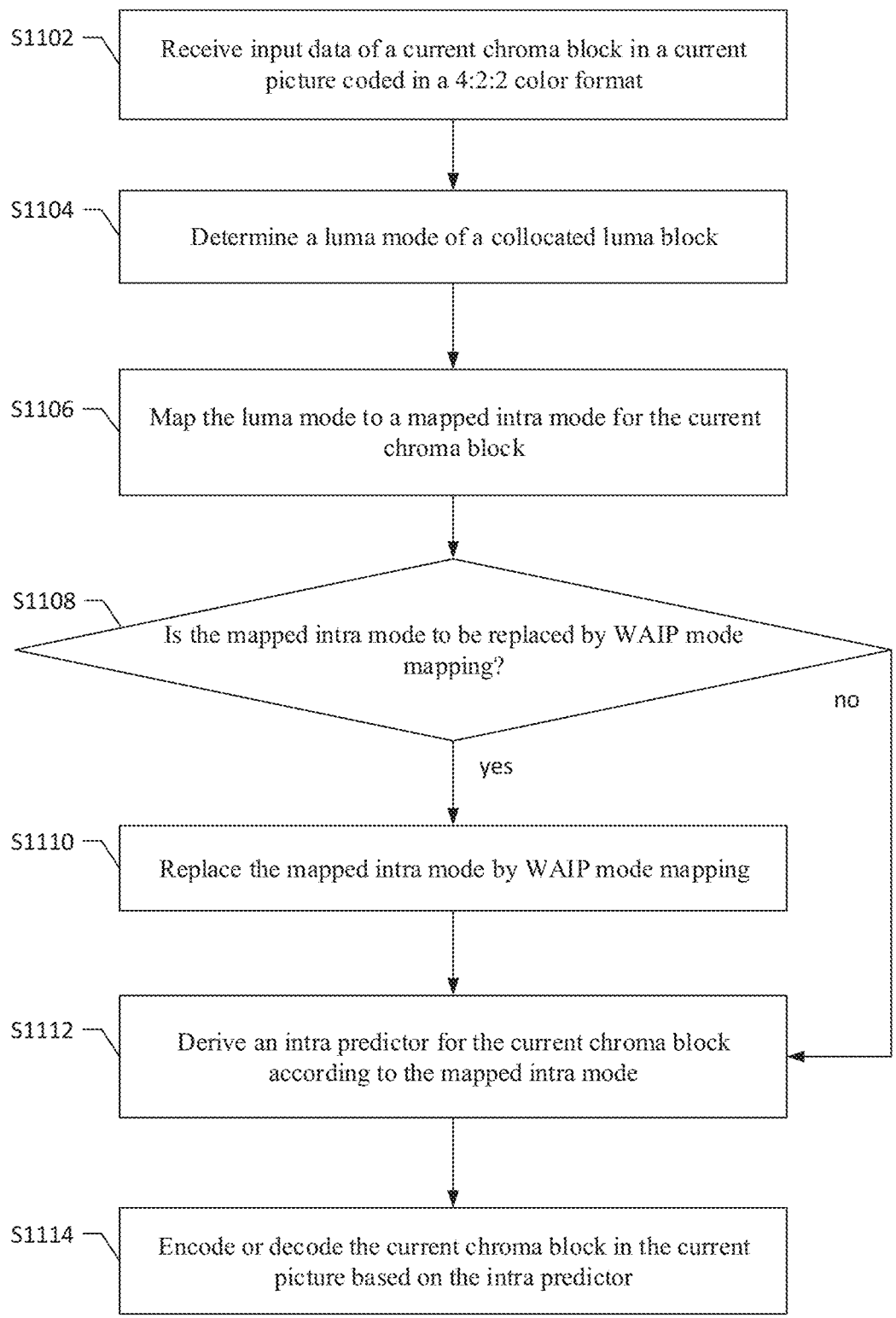
FIG. 11 is a flowchart illustrating an exemplary video processing method according to an embodiment of the present invention.

Representative Exemplary Flowchart FIG. 11 is a flowchart illustrating a video processing method for processing a current chroma block coded or to be coded by Direct Mode (DM) according to embodiments of the present invention. A video encoder or decoder receives input data of the current chroma block in a current picture coded in a 4:2:2 color format in step S1102. In step S1104, a luma mode of a collocated luma block is determined for the current chroma block. The video encoder or decoder maps the luma mode to a mapped intra mode for the current chroma block in step S1106. In various embodiments of the present invention, a mapped intra mode at a bottom-left corner is always a distinct mode from a mapped intra mode at a top-left corner for any width to height ratio. In one specific embodiment, the mapped intra mode is mode 57 when the luma mode is mode 61. For example, for a current chroma block has a width to height ratio of 1:4, the luma mode of mode 61 corresponds to a prediction direction pointing to a bottom-left corner, and the mapped intra mode at the bottom-left corner is mode 57, which is different from the mapped intra mode 56 for a top-left corner. In another example, for a current chroma block has a width to height ratio of 1:8, the luma mode of mode 57 corresponds to a prediction direction pointing to a bottom-left corner, and the mapped intra mode at the bottom-left corner is mode 55, which is different from the mapped intra mode 54 for a top-left corner. In step S1108, the video encoder or decoder checks if the mapped intra mode is to be replaced by WAIP mode mapping according to the width to height ratio of the current chroma block. If the answer to step S1108 is yes, the mapped intra mode is replaced by WAIP mode mapping in step S1110, for example, the mapped intra mode of mode 57 is replaced by mode −10 when the width to height ratio of the current chroma block is 1:4, or the mapped intra mode of mode 55 is replaced by mode −12 when the width to height ratio of the current chroma block is 1:8. After WAIP mode mapping in step S1110, the replaced mapped intra mode is used to derive an intra predictor for the current chroma block in step S1112. If the answer to step S1108 is no, the mapped intra mode is directly used to derive an intra predictor for the current chroma block in step S1112. In step S1114, the video encoder or decoder encodes or decodes the current chroma block according to the intra predictor derived in step S1112.

Keep Relative Direction of Intra Mode for Luma and Chroma Similar Some other embodiments of the present invention keep relative directions of intra prediction modes for luma and chroma components similar when DM is selected for coding the chroma components. For example, when the direction of the intra prediction mode is from the bottom-left corner for the collocated luma Coding Block (CB), which is mode 8 when the width to height ratio is equal to 2, it is preferable to use the intra prediction mode whose direction is from the bottom-left corner for the chroma CB. In this example, the intra prediction mode for the chroma CB is mode −6 when the width to height ratio is equal to 1/2. Compared to the conventional DM coding, the intra prediction mode of the collocated luma CB is directly assigned to the intra prediction mode for the chroma CB when DM is selected. The intra prediction mode for the chroma block is changed according to the chroma CB width and height by WAIP mode mapping. The intra prediction mode is used to do intra prediction after WAIP mode mapping. Embodiments of the present invention apply intra mode mapping to make the relative directions of the intra prediction mode for luma and chroma components similar.

In one embodiment, intra mode mapping is applied to at least one of the following conditions. In one condition, Chroma Separate Tree (CST) is used and chroma DM is selected, the relative directions for luma and chroma components are different if the width to height ratio of the luma and chroma blocks are different. Chroma CBs and luma CBs are in different splitting trees when chroma separate tree is used. In another condition, the relative directions for the reference block and current block are different for generating the MPM list if the width to height ratio of the reference neighboring block and the current block are different.

In previous embodiments, intra mode mapping is applied before WAIP mode mapping, however, in some other embodiments, intra mode mapping is applied after WAIP mode mapping.

In some embodiments of intra mode mapping, the intra prediction mode for a current block is close to the vertical direction when the width to height ratio of a collocated or reference block is larger than the width to height ratio of the current block. In one embodiment, one variable Diff Log Ratio is defined as abs(log 2(ratioWH1))−abs(log 2(ratioWH2)), where ratioWH1 is the width to height ratio for the collocated or reference block and ratioWH2 is the width to height ratio for the current block. In this embodiment, Table 3 is directly looked up recursively and Diff Log Ratio is decreased by one each time after using Table 3. The recursive look-up operations are stopped when at least one of the following conditions is satisfied. Condition 1 is satisfied when the mode before looking up is the same as the mode after looking up. Condition 2 is satisfied when Diff Log Ratio is equal to zero.

In another embodiment, a chroma block with a width and height ratio equal to 1:2 is coded in DM, and a luma intra mode of the collocated luma block is mode 34. The prediction direction of the luma intra mode is pointing to the top-left corner. Instead of directly using mode 34 for the chroma block, mode 40 is used for the chroma block according to this embodiment.

In another embodiment, intra mode mapping is applied to make the intra prediction mode of a current block close to the horizontal direction when the width to height ratio for a collocated or reference block is smaller than the width to height ratio for the current block. One variable, Diff Log Ratio, is defined as abs(log 2(ratioWH1))−abs(log 2(ratioWH2)), where ratioWH1 is the width to height ratio for the collocated or reference block and ratioWH2 is the width to height ratio for the current block. This embodiment directly looks up Table 3 recursively and Diff Log Ratio is decreased by one after each time looking up Table 3. The recursive look-up operations are stopped when at least one of the following conditions is satisfied. The first condition is satisfied when the mode before looking up is the same as the mode after looking up. The second condition is satisfied when this variable Diff Log Ratio is equal to zero. A difference (diffPredMode) between the original intra prediction mode and the intra prediction mode after intra mode mapping is obtained. The intra prediction mode can be changed with the original intra prediction mode and diffPredMode as input. If the mode number of the original intra prediction mode is smaller than the mode number of the vertical direction, the intra prediction mode is set to the original intra prediction−diffPredMode; otherwise if the mode number of the original intra prediction mode is larger than the mode number of the vertical direction, the intra prediction mode is set to the original intra prediction mode+diffPredMode.

In another embodiment, the intra prediction mode is limited into a range of the directional modes after intra mode mapping. For example, the range of the directional modes is [2, 33] for a total of 35 intra prediction modes or [2, 65] for a total of 67 intra prediction modes. In yet another embodiment, the intra prediction mode of a current block is limited into a range of wide angle modes for the current block. In another embodiment, intra mode mapping is only used for angular modes and is not used for non-angular modes such as Planar and DC modes.

In some embodiments, a check is required to make sure the intra prediction mode after intra mode mapping is not equal to any default chroma mode. For example, the default chroma modes include one or a combination of Linear Model (LM) family modes such as Cross-Component Linear Model (CCLM), CCLM_LEFT, and CCLM_TOP, horizontal mode, vertical mode, and diagonal mode. An adjacent intra prediction mode such as the intra prediction mode+1 or the intra prediction mode −1 is used instead if the intra prediction mode is equal to one of the default chroma modes. The unit of CB in the previous embodiments may be replaced with the unit of TB.

Figure 12:
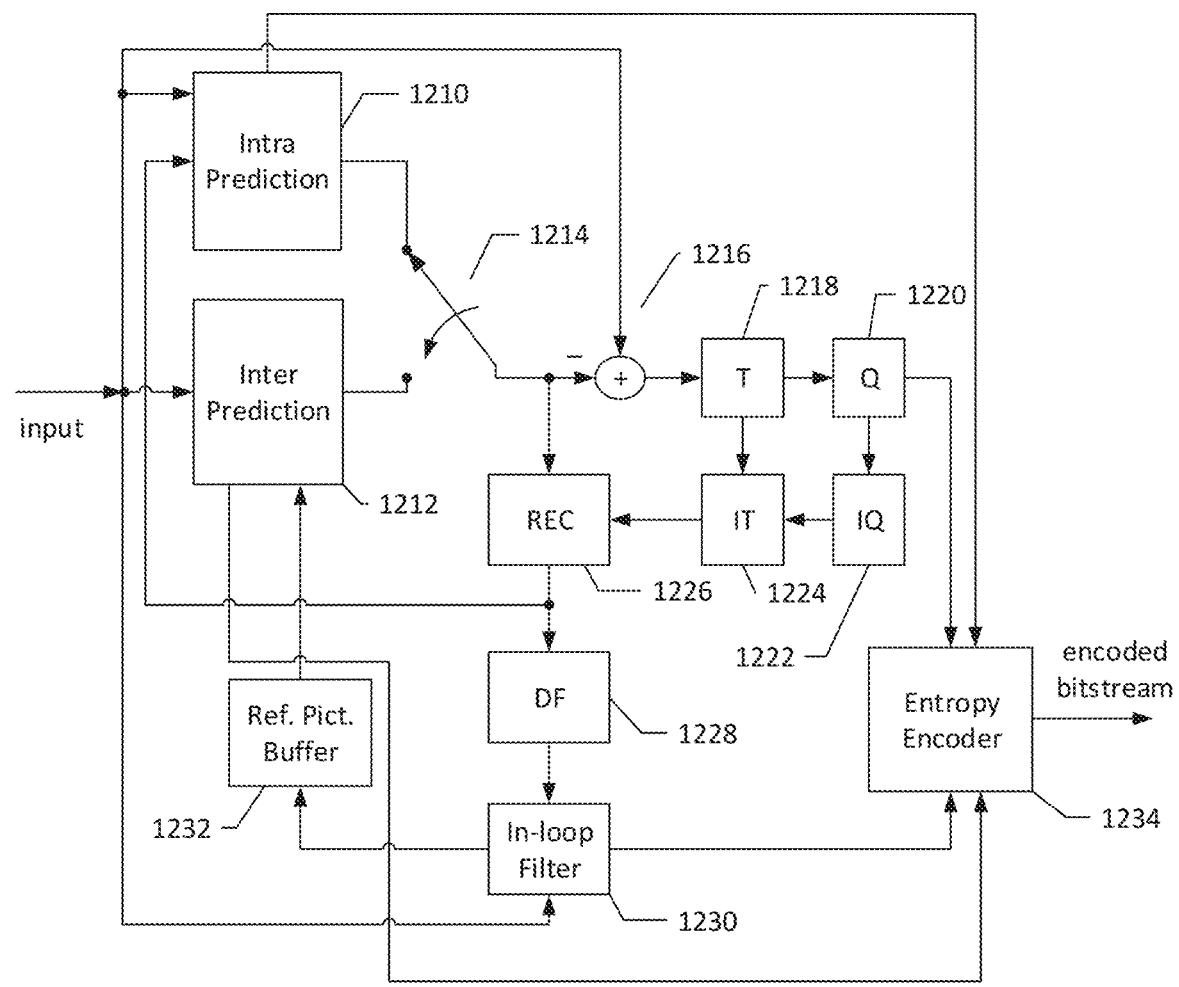
FIG. 12 illustrates an exemplary system block diagram for a video encoding system incorporating the video processing method according to embodiments of the present invention.

Representative Block Diagrams FIG. 12 illustrates an exemplary system block diagram for a Video Encoder 1200 implementing one or more of the video processing methods of the present invention. A current chroma block is to be encoded by neighboring reconstructed samples according to Direct Mode (DM). The current chroma block is within a current picture coded in a 4:2:2 color format. An Intra Prediction module 1210 determines a luma mode of a collocated luma block of the current chroma block. The luma mode is mapped to a mapped intra mode according to a mapping table, such as the mapping table as shown in Table 5. The mapped intra mode is mode 57 when the luma mode is mode 61 and the mapped intra mode is mode 55 when the luma mode is mode 57 according to embodiments of the present invention. The Intra Prediction module 1210 selectively replaces the mapped intra mode by WAIP mode mapping based on a width to height ratio of the current chroma block. The Intra Prediction module 1210 generates an intra predictor from reference samples of the current chroma block according to the mapped intra mode after WAIP mode mapping. An Inter Prediction module 1212 performs Motion Estimation (ME) and Motion Compensation (MC) on blocks to be coded by inter prediction to provide inter predictors based on video data from other picture or pictures. Either the Intra Prediction module 1210 or Inter Prediction module 1212 supplies the selected predictor to an Adder module 1216 to form prediction errors, also called prediction residues. Since the current chroma block is encoded by intra prediction, the Intra Prediction module 1210 sends the intra predictor for the current chroma block to the Adder module 1216 to produce prediction residues of the current chroma block.

The prediction residues of the current chroma block are further processed by a Transformation (T) module 1218 followed by a Quantization (Q) module 1220. The transformed and quantized residual signal is then encoded by an Entropy Encoder 1234 to form an encoded video bitstream. The encoded video bitstream is then packed with side information. The transformed and quantized residual signal of the current chroma block is processed by an Inverse Quantization (IQ) module 1222 and an Inverse Transformation (IT) module 1224 to recover the prediction residues. As shown in FIG. 12, the prediction residues are recovered by adding back to the selected predictor at a Reconstruction (REC) module 1226 to produce reconstructed samples. The reconstructed samples may be stored in a Reference Picture Buffer (Ref. Pict. Buffer) 1232 and used for prediction of other pictures. The reconstructed samples from the REC 1226 may be subject to various impairments due to the encoding processing, consequently, an in-loop processing Deblocking Filter (DF) 1228 and an in-loop filter 1230 are applied to the reconstructed samples before storing in the Reference Picture Buffer 1232 to further enhance picture quality. Syntax associated with information for the in-loop processing DF 1228 and in-loop filter 1230 are provided to the Entropy Encoder 1234 for incorporation into the encoded video bitstream.

Figure 13:
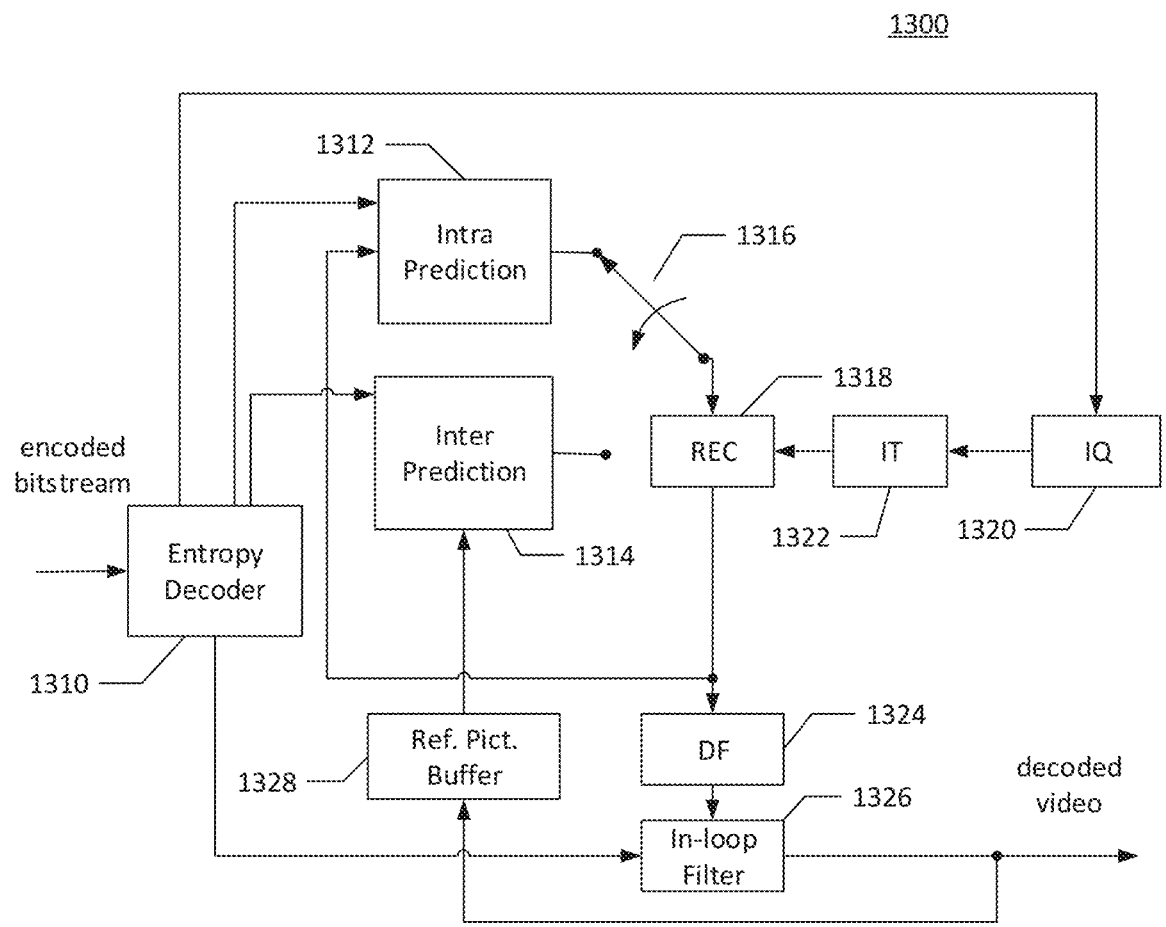
FIG. 13 illustrates an exemplary system block diagram for a video decoding system incorporating the video processing method according to embodiments of the present invention.

A corresponding Video Decoder 1300 for the Video Encoder 1200 of FIG. 12 is shown in FIG. 13. The encoded video bitstream is the input to the Video Decoder 1300 and is decoded by the Entropy Decoder 1310 to parse and recover the transformed and quantized residual signal and other system information. The decoding process of the Decoder 1300 is similar to the reconstruction loop at the Encoder 1200, except the Decoder 1300 only requires motion compensation prediction in an Inter Prediction module 1314. Each block is decoded by either an Intra Prediction module 1312 or the Inter Prediction module 1314. A Switch module 1316 selects an intra predictor from the Intra Prediction module 1312 or an Inter predictor from the Inter Prediction module 1314 according to decoded mode information. The Intra Prediction module 1312 decodes a luma mode of a collocated block for a current chroma block coded in DM. The luma mode is mapped into a mapped intra mode according to various embodiments of the present invention, where the mapped intra mode for a prediction direction pointing to a bottom-left corner is a distinct mode from the mapped intra mode for a prediction direction pointing to a top-left corner. For example, the mapped intra mode is mode 57 when the luma mode is mode 61 for the current chroma block with a width to height ratio of 1:4, and the mapped intra mode is mode 55 when the luma mode is mode 57 for the current chroma block with a width to height ratio of 1:8. The mapped intra mode is selectively replaced by WAIP mode mapping based on the width to height ratio of the current chroma block. The Intra Prediction module 1312 derives an intra predictor for the current chroma block from reference samples of the current chroma block according to the mapped intra mode after WAIP mode mapping. The transformed and quantized residual signal associated with each block is recovered by an Inverse Quantization (IQ) module 1320 and an Inverse Transformation (IT) module 1322. The recovered transformed and quantized residual signal is reconstructed by adding back the predictor in the REC module 1318 to produce reconstructed samples. The reconstructed samples are further processed by a DF 1324 and an in-loop filter 1326 to generate final decoded video. If the currently decoded picture is a reference picture, the reconstructed samples of the currently decoded picture are also stored in a Reference Picture Buffer 1328 for later pictures according to a decoding order.

Various components of the Video Encoder 1200 and Video Decoder 1300 in FIG. 12 and FIG. 13 may be implemented by hardware components, one or more processors configured to execute program instructions stored in a memory, or a combination of hardware and processor. For example, a processor executes program instructions to control mapping the luma mode to a mapped intra mode for each chroma block coded or to be coded in DM. The processor is equipped with a single or multiple processing cores. In some examples, the processor executes program instructions to perform functions in some components in the Encoder 1200 and Decoder 1300, and the memory electrically coupled with the processor is used to store the program instructions, information corresponding to the reconstructed images of blocks, and/or intermediate data during the encoding or decoding process. The memory in some embodiment includes a non-transitory computer readable medium, such as a semiconductor or solid-state memory, a random access memory (RAM), a read-only memory (ROM), a hard disk, an optical disk, or other suitable storage medium. The memory may also be a combination of two or more of the non-transitory computer readable medium listed above. As shown in FIGS. 12 and 13, the Encoder 1200 and Decoder 1300 may be implemented in the same electronic device, so various functional components of the Encoder 1200 and Decoder 1300 may be shared or reused if implemented in the same electronic device. For example, one or more of the Reconstruction module 1226, Inverse Transformation module 1224, Inverse Quantization module 1222, Deblocking Filter 1228, in-loop filter 1230, and Reference Picture Buffer 1232 in FIG. 12 may also be used to function as the Reconstruction module 1318, Inverse Transformation module 1322, Inverse Quantization module 1320, Deblocking Filter 1324, in-loop filter 1326, and Reference Picture Buffer 1328 in FIG. 13, respectively.

Embodiments of the processing method for a video coding system may be implemented in a circuit integrated into a video compression chip or program code integrated into video compression software to perform the processing described above. For examples, selecting a filter among multiple reference sample filters for each intra coded block may be realized in program code to be executed on a computer processor, a Digital Signal Processor (DSP), a microprocessor, or field programmable gate array (FPGA). These processors can be configured to perform particular tasks according to the invention, by executing machine-readable software code or firmware code that defines the particular methods embodied by the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A video processing method in a video coding system, comprising:
    receiving input video data associated with a current chroma block in a current picture coded in a 4:2:2 color format;
    determining a luma mode of a luma block corresponding to the current chroma block;
    mapping the luma mode to a mapped intra mode for the current chroma block, wherein the mapped intra mode is mode 57 when the luma mode is mode 61 and the mapped intra mode is mode 55 when the luma mode is mode 57;
    selectively replacing the mapped intra mode by Wide Angle Intra Prediction (WAIP) mode mapping based on a width to height ratio of the current chroma block;
    deriving an intra predictor for the current chroma block according to the mapped intra mode after WAIP mode mapping; and
    encoding or decoding the current chroma block according to the intra predictor.

2. The method of claim 1, wherein the mapped intra mode of mode 57 corresponds to a prediction direction pointing to a bottom-left corner when the width to height ratio of the current chroma block is 1:4.

3. The method of claim 2, wherein the mapped intra mode of mode 57 is replaced by mode −10 after WAIP mode mapping.

4. The method of claim 1, wherein the mapped intra mode of mode 55 corresponds to a prediction direction pointing to a bottom-left corner when the width to height ratio of the current chroma block is 1:8.

5. The method of claim 4, wherein the mapped intra mode of mode 55 is replaced by mode −12 after WAIP mode mapping.

6. The method of claim 1, wherein the current chroma block is coded or to be coded in Direct Mode (DM), and the luma block is a collocated block of the current chroma block.

7. The method of claim 1, wherein the mapped intra modes for the current chroma block at a bottom-left corner, immediate left, top-left corner, immediate top, and top-right corner are 57, 18, 44, 50, and 56 when the width to height ratio is 1:4.

8. The method of claim 1, wherein the mapped intra modes for the current chroma block at a bottom-left corner, immediate left, top-left corner, immediate top, and top-right corner are 55, 18, 46 50, and 54 when the width to height ratio is 1:8.

9. The method of claim 1, wherein the mapped intra modes for the current chroma block at a bottom-left corner, immediate left, top-left corner, immediate top, and top-right corner are 53, 18, 48, 50, and 52 when the width to height ratio is 1:16.

10. The method of claim 1, wherein the mapped intra modes for the current chroma block at a bottom-left corner, immediate left, top-left corner, immediate top, and top-right corner are 8, 18, 38, 50, and 7 when the width to height ratio is 2:1.

11. The method of claim 1, wherein the mapped intra modes for the current chroma block at a bottom-left corner, immediate left, top-left corner, immediate top, and top-right corner are 12, 18, 24, 50, and 11 when the width to height ratio is 4:1.

12. The method of claim 1, wherein the mapped intra modes for the current chroma block at a bottom-left corner, immediate left, top-left corner, immediate top, and top-right corner are 14, 18, 22, 50, and 13 when the width to height ratio is 8:1.

13. The method of claim 1, wherein the mapped intra modes for the current chroma block at a bottom-left corner, immediate left, top-left corner, immediate top, and top-right corner are 16, 18, 20, 50, and 15 when the width to height ratio is 16:1.

14. The method of claim 1, wherein the mapped intra modes replaced by WAIP mode mapping are modes 61 to 66 when the width to height ratio of the current chroma block is 1:2, the mapped intra modes replaced by WAIP mode mapping are modes 57 to 66 when the width to height ratio of the current chroma block is 1:4, the mapped intra modes replaced by WAIP mode mapping are modes 55 to 66 when the width to height ratio of the current chroma block is 1:8, and the mapped intra modes replaced by WAIP mode mapping are modes 53 to 66 when the width to height ratio of the current chroma block is 1:16.

15. The method of claim 1, wherein the mapped intra modes replaced by WAIP mode mapping are modes 2 to 7 when the width to height ratio of the current chroma block is 2:1, the mapped intra modes replaced by WAIP mode mapping are modes 2 to 11 when the width to height ratio of the current chroma block is 4:1, the mapped intra modes replaced by WAIP mode mapping are modes 2 to 13 when the width to height ratio of the current chroma block is 8:1, and the mapped intra modes replaced by WAIP mode mapping are modes 2 to 15 when the width to height ratio of the current chroma block is 16:1.

16. The method of claim 1, wherein the step of mapping the luma mode to a mapped intra mode for the current chroma block is executed by looking up a mapping table, wherein the mapping table is used for all chroma blocks coded or to be coded in Direct Mode (DM) with different width to height ratios.

17. The method of claim 16, wherein by looking up the mapping table, the luma mode of mode 61 or mode 62 is mapped to mode 57, the luma mode of mode 57 or mode 58 is mapped to mode 55, and the luma modes of modes 2 to 7 are mapped to modes 61 to 66.

18. An apparatus of processing video data in a video coding system, the apparatus comprising one or more electronic circuits configured for:

receiving input video data associated with a current chroma block in a current picture coded in a 4:2:2 color format;

determining a luma mode of a luma block corresponding to the current chroma block;

mapping the luma mode to a mapped intra mode for the current chroma block, wherein the mapped intra mode is mode 57 when the luma mode is mode 61 and the mapped intra mode is mode 55 when the luma mode is mode 57;

selectively replacing the mapped intra mode by Wide Angle Intra Prediction (WAIP) mode mapping based on a width to height ratio of the current chroma block;

deriving an intra predictor for the current chroma block according to the mapped intra mode after WAIP mode mapping; and encoding or decoding the current chroma block according to the intra predictor.

19. A non-transitory computer readable medium storing program instruction causing a processing circuit of an apparatus to perform video processing method, and the method comprising:

receiving input video data associated with a current chroma block in a current picture coded in a 4:2:2 color format;

determining a luma mode of a luma block corresponding to the current chroma block;

mapping the luma mode to a mapped intra mode for the current chroma block, wherein the mapped intra mode is mode 57 when the luma mode is mode 61 and the mapped intra mode is mode 55 when the luma mode is mode 57;

selectively replacing the mapped intra mode by Wide Angle Intra Prediction (WAIP) mode mapping based on a width to height ratio of the current chroma block;

deriving an intra predictor for the current chroma block according to the mapped intra mode after WAIP mode mapping; and encoding or decoding the current chroma block according to the intra predictor.

* * * * *